350-286

CROSS REFERENCE SEARCH ROOM

May 31, 1966 W. S. MILLER 3,253,505

PROJECTION OF IMAGES ONTO INCLINED SCREENS

Filed Jan. 11, 1965 3 Sheets-Sheet 1

INVENTOR.
WENDELL S. MILLER
BY William P. Green
ATTORNEY

May 31, 1966 W. S. MILLER 3,253,505

PROJECTION OF IMAGES ONTO INCLINED SCREENS

Filed Jan. 11, 1965 3 Sheets-Sheet 2

WENDELL S. MILLER
INVENTOR.

BY William P. Green
ATTORNEY

WENDELL S. MILLER
INVENTOR.
BY William P. Green
ATTORNEY

United States Patent Office 3,253,505
Patented May 31, 1966

3,253,505
PROJECTION OF IMAGES ONTO INCLINED SCREENS

Wendell S. Miller, 1341 Comstock Ave., Los Angeles, Calif.

Filed Jan. 11, 1965, Ser. No. 424,755
30 Claims. (Cl. 88—24)

Certain features of the apparatus shown in the present application have been disclosed and claimed in my copending application Serial No. 217,186, filed August 15, 1962, on "Distortion Free Projection System."

This invention relates to improved projection apparatus, of a type especially designed for projecting an image onto a screen which is inclined with respect to the main optical axis of the projection system. Particularly contemplated are projection systems which are capable of projecting onto such an inclined screen and which automatically eliminate or compensate for the keystone distortion which normally results from the mere act of projecting onto an inclined screen. In this connection, "keystone distortion" may be defined for present purposes as the tendency to distort an initially rectangular image to a trapezoidal shape in which one portion of the image is widened relative to another portion by reason of differences in the distances which light forming various portions of the image must travel to reach different portions of the inclined screen.

In one form of the invention, I compensate for this keystone distortion by passing the light rays sequentially through two successive optical systems, a first of which introduces an initial keystone distortion, and the second of which tends to produce an opposite keystone distortion acting to at least partially compensate for the first distortion and return the ultimate inclined image to a proper undistorted condition. More specifically, this is attained by constructing the apparatus so that the image produced by the first system is inclined in a direction producing the first type of keystone distortion, while the image produced by the second system is inclined in a direction compensating for the original distortional effect.

In another form of the invention, I employ two successive afocal optical systems, each of which may be constructed in accordance with the teachings of my prior copending application Serial Number 217,186. Such afocal systems act inherently to avoid the development of any keystone distortion in the image ultimately produced by each such system. However, it has been found that a single afocal system of the discussed type has a very limited capacity for magnification, and therefore cannot produce a projected image large enough for many uses. For this reason, I utilize two such afocal sytsems, as mentioned, with the light first passing through one system, and the resultant image subsequently being projected through the second system.

In both of the two general arrangements discussed above, problems are encountered in attaining an ultimate image of sufficient brightness to serve as a practical overall projector structure. In the case of the first discussed compensating type of arrangement, where a first optical system produces an initial keystone distortion, and a second system produces an opposite and compensating keystone distortion, the tendency for lack of brightness results from the fact that the second system receives light from the image produced by the first system through only a very limited angle, and light extending in other directions from that image is lost without transmission through the second system. In the double afocal arrangement also, the second afocal system tends to receive only a small percentage of the light from the image produced by the first system, with resultant loss in brightness in the ultimate image.

A major object of the present invention is to provide means for increasing the percentage of the available light in a first projected image which can be received, transmitted and projected by a second optical system, in either of the above discussed two types of overall arrangement. In each instance, this result is attained by use of a unique optical director structure, which is located at approximately the focal plane of the image produced by the first of the two successive optical systems, and which is constructed to effectively direct the light of that image in concentrated manner toward the entrance side of the second optical system. More particularly, the director structure deflects the light from different portions of the image primarily along converging paths, which converge to a reduced overall cross section as the light approaches the second optical system. The director structure may be a reflector having a large number of facets positioned to receive the light of different portions of the image, and shaped and positioned to reflect the light along the defined converging paths. In the compensating distortion type of system, these facets direct the light along an essentially abnormal reflective path, to introduce the desired secondary or compensating keystone distortion. If desired, the facets may be elongated and curved in one direction, and form a sawtooth type of cross section in a perpendicular direction. In the afocal arrangement, the optical director system or structure may take the form of a concave, desirably spherical, mirror, in which separate facets are unnecessary.

Instead of a reflector or mirror, I may utilize as the director structure an appropriate lens system, acting to converge or concentrate the light of the initial image in appropriate manner. In view of the size of lens required for this purpose, a Fresnel type of lens is found most practical.

It is also contemplated that the reflector or lens forming the director system may have a slight diffusing characteristic with respect to the light reflected or transmitted thereby, in which case the director structure may be referred to as a slightly diffusing screen, with the result that the accuracy of formation of the facets of the reflector or Fresnel lens may be less precise without introducing any obvious errors in the ultimately projected final image.

The above and other features and objects of the invention will be better understood from the following detailed description of the typical embodiments illustrated in the accompanying drawings, in which.

Figures 1, 2, 3:
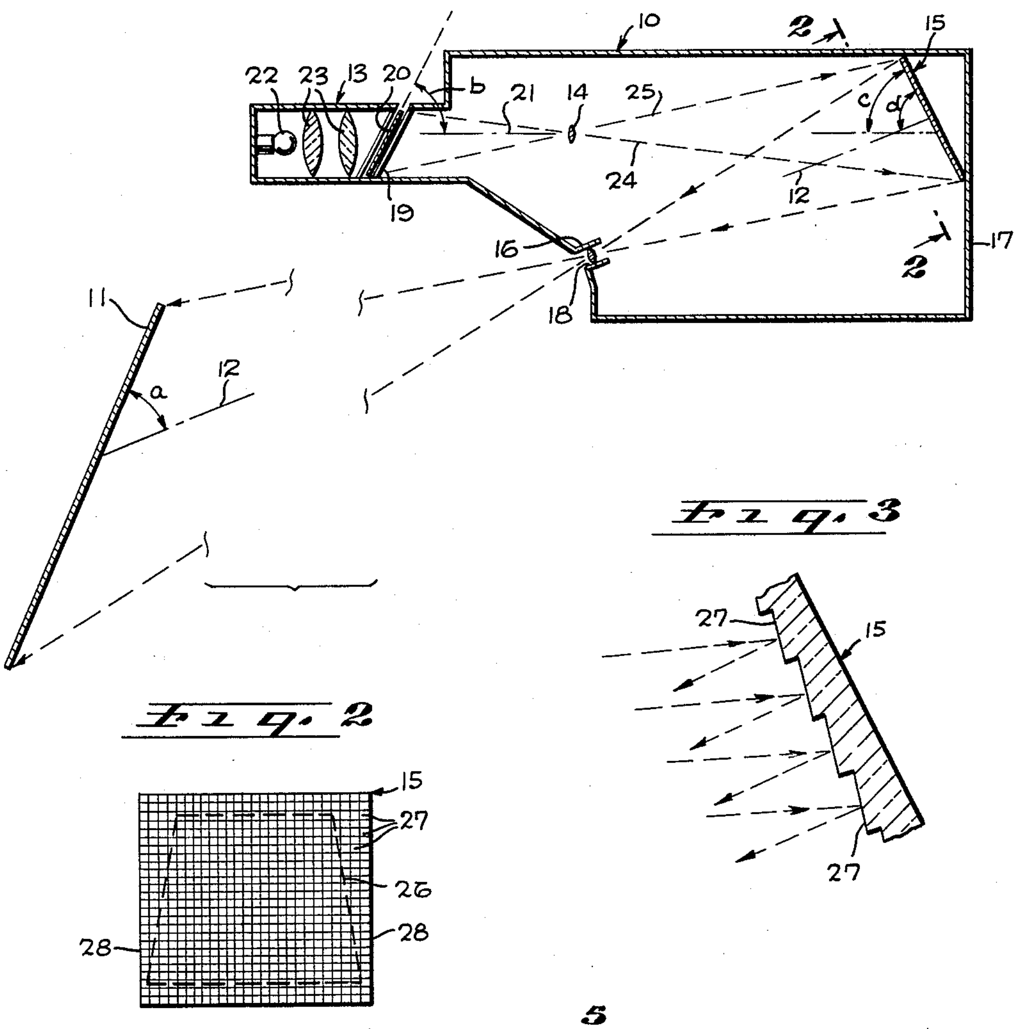
FIG. 1 is a diagrammatic showing of a first form of projection system constructed in accordance with the invention.
FIG. 2 is a view taken on line 2—2 of FIG. 1.
FIG. 3 is an enlarged fragmentary showing of the reflector or director structure of FIG. 1.

With reference first to FIG. 1, I have shown diagrammatically in that figure a projector which is designated generally by the numeral 10, and which is designed to project an image onto a screen 11 inclined at an oblique angle *a* with respect to the main optical axis 12 along which the light is projected onto the screen. The projector is illustrated as including a film holding and illuminating section 13, a first projection lens system 14, a reflector 15, and a second projection lens system 16. The units 13, 14, 15 and 16 are desirably all mounted within and to a common overall housing represented at 17, and containing an appropriate aperture 18 for passing the projection beam from final lens 16 to the screen. It will of course be apparent that no attempt has been made in the diagrammatic showing of FIG. 1 to illustrate the actual physical proportions or sizes which the various parts of the apparatus would have in a preferred embodiment of the invention. For instance, screen 11 would obviously be much larger than the entire projector 10, and would be offset to the left in FIG. 1 many times the illustrated distance. However, in order to enable the screen to be illustrated in the same figure as the projector, the size and position of the screen have been altered in a manner resulting in a highly diagrammatic representation of the projector system.

Section 13 of the projector includes a film holder 19 forming a guideway within which a film 20 is held at an oblique inclination *b* with respect to the optical axis 21 of first projection lens 14. The film within holder 19 is illuminated by an appropriate electric lamp or other source 22, in conjunction with condenser lenses 23 acting to distribute the light uniformly across the entire surface of the film.

This diagrammatic showing at 13 of means for holding and illuminating a film 20 may be considered as representing the film holding and illuminating portion of either a still projector or a motion picture projector. In the latter case, a series of frames of a motion picture film, carrying appropriate images to be projected onto screen 11, are successively moved to the position represented by the film 20 in FIG. 1.

Lens 14 may be any conventional focal projection lens, consisting of either a single lens element or a plurality of matched elements, acting to project onto reflector structure 15 an image of the picture or other markings carried on film 20. Screen 15 is inclined at an oblique angle *c* with respect to the main optical axis 21 of lens system 14, which angle is correlated to the angle of inclination *b* of film 20, in a relation such that the projected image is in focus at all points on reflector 15. As will be understood, the inclination of film 20 causes a corresponding but greater inclination of the image projected by lens 14, when that image is in focus. Lens 14 in the FIG. 1 arrangement is selected to be of a type acting to produce an image lying in a plane, and reflector 15 correspondingly lies in essentially a plane.

The discussed inclination of reflector 15 causes the image produced on that reflector, though in focus at all points, to nevertheless have keystone type distortion. That is, because of the fact that the light rays travelling from lens 14 to the lower portion of reflector 15, as designated by the numeral 24 in FIG. 1, must travel farther before reaching the reflector than do the upper light rays designated 25, the lower rays 24 have an opportunity to flare farther apart before reaching the reflector, so that the lower portions of the projected image are wider than the upper portions, with the width progressively decreasing from the bottom to the top of the image, to produce a distorted image of trapezoidal shape as illustrated at 26 in FIG. 2.

The distorted image 26 on reflector 15 is viewed by the second lens system 16, which like the first system 14 may consist of one or more elements functioning as a projection lens structure acting to reproject the image in focused form as a second image on inclined viewing screen 11. With regard to the second projection system, it is noted that reflector 15, besides being inclined with respect to axis 21 of lens system 14, is also inclined, at an angle designated *d* with respect to the optical axis 12 of system 16. This inclination *d* is predetermined and of just the proper value to cause inclination of the ultimate projected image at the angle *a*, when focused, so that the image on screen 11 will be in focus at all points. Also, it is pointed out that the direction of inclination of reflector 15 and screen 11 with respect to axis 12 is such as to tend to produce a keystone distortion in the ultimate image which is the opposite of and preferably exactly compensates for, the keystone distortion represented in FIG. 2 and produced by system 14, so that the image on screen 11 is less trapezoidal, and preferably exactly rectangular to remove all keystone distortion from the viewed image. More particularly, it is noted that the light rays which pass from the lower portion of reflector 15 through lens 16 ultimately are projected onto the upper portion of inclined screen 11, and therefore travel a shorter distance than do the rays from the upper portion of reflector 15 which finally strike the lower portion of screen 11. In this way, the bottom part of the image on screen 11 is widened relative to the upper portion of the image, to attain the desired compensating keystone distortion effect. It will of course be understood that lens systems 14 and 16 may be of a focusing type, adapted to be adjusted to attain the discussed focus of the first and second images on reflector 15 and screen 11 respectively.

If reflector 15 were a planar mirror, most of the light striking it would be deflected downwardly in a true reflection pattern, and could not therefore reach lens 16, which must be positioned as shown in order to introduce the desired compensating distortional effect. If reflector 15 were a non-specular projection screen, some of the light of image 26 would be reflected toward and be projected by lens 16, but a large portion of the image light would emanate in other directions and not strike lens 16, so that the image projected on screen 11 would be less bright than is desired. In order to overcome these disadvantages, I preferably construct reflector 15 to function as a light director, which preferentially directs the light of the image on reflector 15 towards the entrance pupil of lens system 16. For this purpose, reflector 15 may be shaped to form or present a large number of very small individual specularly reflective facets 27, distributed across the entire face of reflector 15, and each occupying only a very small portion of the area of the reflector. Each facet is disposed at a slightly different angle than all of the other facets, with the angle of each facet being so selected and predetermined as to reflect the pencil of light received by that particular facet from lens 14 directly toward the entrance pupil of lens system 16. Thus, the different pencils of light from various different facets 27 are directed along paths which converge toward lens 16, with the result that the light forming the image on reflector 15 is directed preferentially toward lens 16, and desirably in a manner such that substantially all, or almost all, of the light of the image reaches lens 16 and is projected onto screen 11.

When viewed in vertical cross section, the facets 27 of reflector 15 form the sawtooth cross sectional configuration illustrated in FIG. 3, with the inclination of successive facets 27 forming the sawtooth being slightly different from one another. Also, the facets 27 of each horizontal row of such facets are turned horizontally inwardly at progressively increasing angles as they approach the opposite side edges 28 of the screen, to direct the light inwardly toward lens 16.

Facets 27 may be completely specular in reflective characteristics, or may be substantially specular but have a slight diffusing characteristic in order to reduce the precision with which facets 27 must be formed to give them the desired capacity for directing substantially all of the light of the image on reflector 15 to lens 16.

To prevent the introduction of distortion into the projected image, the second lens system 16 should be very slightly smaller than the size of each of the pencils of light falling on it, that is, the lens 16 should act as the aperture stop of the overall projection system. Also, it is desirable that the primary principal plane of each lens system 14 and 16 coincide with the entrance pupil of that system, with that pupil being of such a size as to pass only a symmetrical pencil of light therethrough, and not an eccentric pencil.

Figure 4:
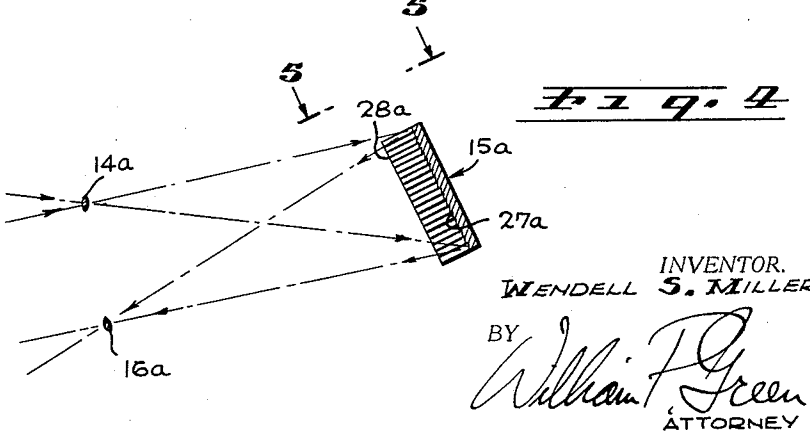
FIG. 4 shows fragmentarily a variational form of reflector which may be employed in the FIG. 1 system.
Figures 5, 6:
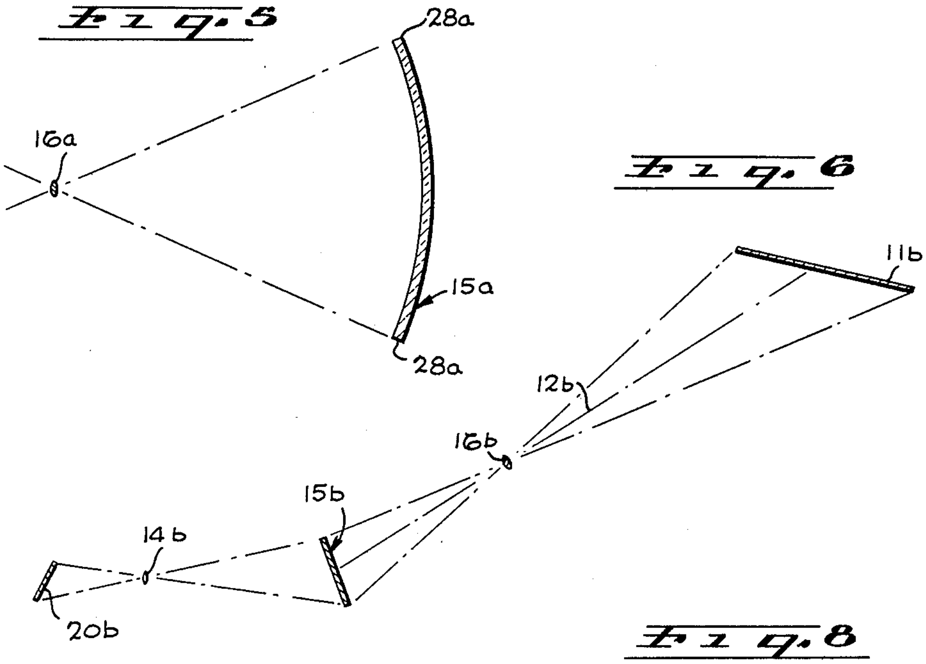
FIG. 5 is a view taken on line 5—5 of FIG. 4.
FIG. 6 is a diagrammatic representation, similar to FIG. 1, but showing a variational type of projection system utilizing a lens instead of the reflector of FIG. 1.

FIGS. 4 and 5 represent a variational form of projector system which may be considered as identical with that of FIGS. 1, 2 and 3, except for the substitution of a curved reflector **15*a* for the reflector 15 of FIG. 1, in which all of the facets 27 are disposed essentially in a common transverse plane. In FIG. 4, first lens 14*a* is of a type which produces a cylindrically curved rather than planar image, and reflector 15*a* is correspondingly curved to cause its various facets 27*a* to all receive a focused segment of the image. Each of the facets 27*a* may be horizontally elongated and may curve arcuately as shown in FIG. 5 continuously between the two opposite side edges 28*a* of the reflector. This curvature is just such as to direct substantially all of the light falling on each elongated curved facet 27*a* into the second lens system 16*a*. Similarly, the different facets 27*a* all have different angularities, selected and predetermined to direct the light of the focused image along converging paths into lens 16*a*. Thus, the reflector 15*a* has a sawtoothed vertical cross section, similar to that shown in FIG. 3. The facets 27*a*** may, as in FIGS. 1 to 3, be totally specular in their reflective characteristics, or may have a slight amount of diffusing capacity.

FIG. 6 is a diagrammatic Gaussian representation of a variational type of system which is the same as that shown in FIG. 1 except for the substitution of a lens or lens assembly **15*b* as the light directing structure, in lieu of reflector 15. A first lens assembly 14*a* projects a focused and inclined image in the first principal plane of lens 15*b*, with that image representing the markings on film 20*b*. A second projection lens assembly 16*b*, corresponding to lens 16 of FIG. 1, projects the image from lens 15*b* onto inclined screen 11*b*. The angularities of the image produced in lens 15*b* and the image produced on screen 11*b* with respect to the main optic axis 12*b* of lens 16*b*** are the same as the corresponding angularities *d* and *a* in FIG. 1. Thus, lens **14*b* may introduce the first keystone distortion into the image, and lens 16*b* introduces a second and opposite keystone distortion acting to compensate for the initial distortion and return the image on screen 11*b* to a true rectangular form. The director lens assembly 15*b* serves the dual purposes of converging the light from the initial image, and also refracting the light to follow along optic axis 12*b***, at an appropriate angle to attain just sufficient compensation for the first keystone distortion.

Figure 7:
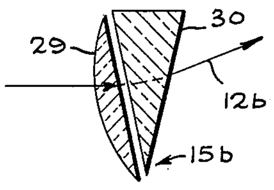
FIG. 7 illustrates a lens system which may be employed in the FIG. 6 apparatus.

FIG. 7 shows one form of lens assembly which may be utilized at the location **15*b* of FIG. 6. This lens assembly 15*b* may include a double convex or convexo-planar lens 29 having its primary principal plane located at the focal plane of lens 14*b*, and shape to converge the light just sufficiently to direct it substantially entirely, or at least predominantly, through lens 16*b*. In conjunction with lens 29, the assembly represented at 15*b* in FIG. 6 may include a prism 30, acting to refract the converging light laterally as required to follow the optic axis 12*b* of FIG. 6, into lens assembly 16*b***.

Figure 8:
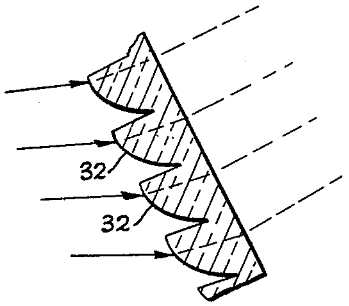
FIG. 8 shows a variational Fresnel type of lens which may be substituted for that of FIG. 6.

FIG. 8 illustrates another lens which may be employed at **15*b*, and which is a Fresnel type lens having a large number of portions or segments 32 projecting and shaped as shown, and designed to function in the same overall manner as the two elements 29 and 30** of FIG. 7.

Figures 9, 10:
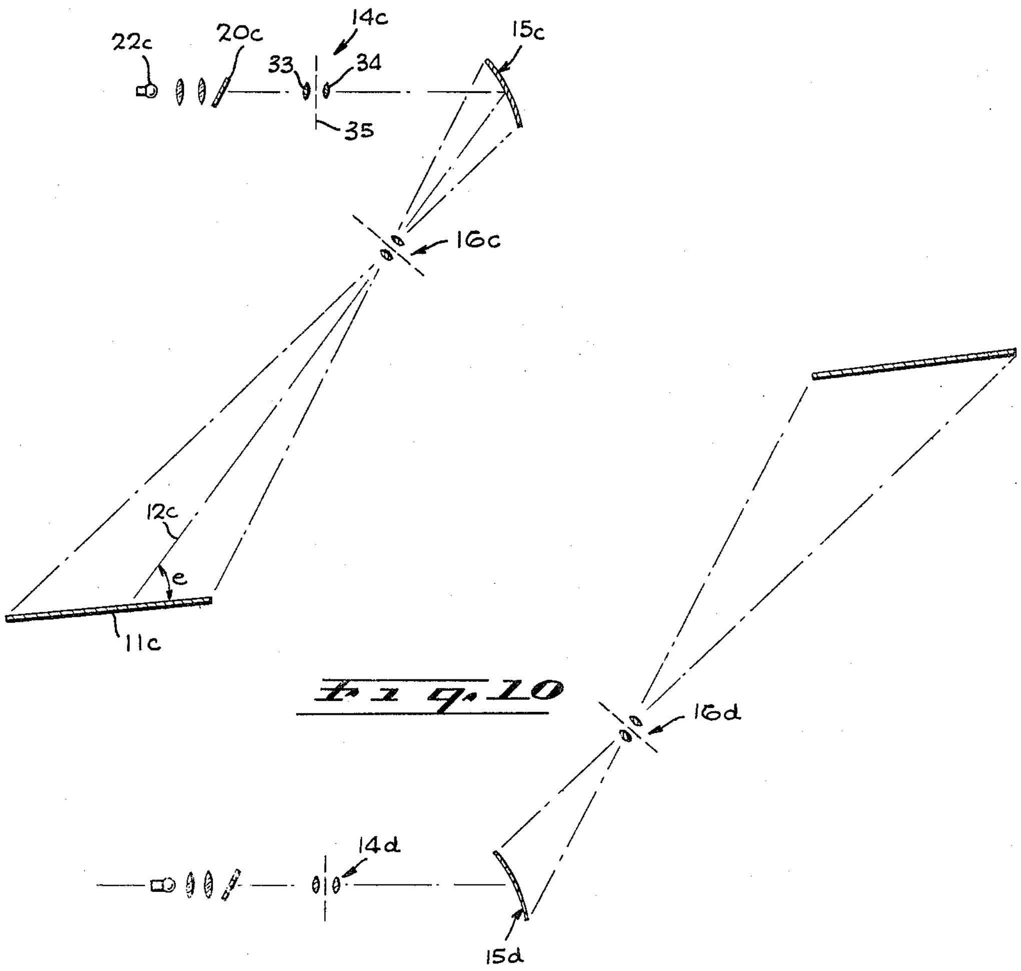
FIG. 9 shows another form of the invention utilizing afocal optical systems.
FIG. 10 shows a variation of the FIG. 8 arrangement, with a lens substituted for the mirror.

FIG. 9 shows a variational arrangement in which there are substituted for the first and second lens systems 14 and 16 of FIG. 1 two afocal lens systems **14*c* and 16*c*, each constructed in accordance with the teachings of my copending application Serial Number 217,186, filed August 15, 1962, entitled "Distortion Free Projection System." As brought out in that application, these afocal systems have an inherent capacity for projecting an image without keystone distortion, and it is consequently unnecessary in FIG. 9 to provide a second system for introducing a keystone distortion which is the opposite of and compensates for the distortion introduced by a first system. Rather, the purpose of using two successive systems 14*c* and 16*c* in FIG. 9 is to attain a magnification in the ultimate image projected on screen 11*c***, which is greater than that attainable by a single afocal system.

The image of film **20*c*, illuminated by lamp 22*c*, is projected by lens system 14*c* onto a reflector 15*c*, which is in turn viewed by system 16*c* to project the final image onto screen 11*c***, which is disposed at an angle *e* with respect to the main optic axis **12*c*. In order that the image on screen 11*c* may be in focus at all points, in spite of the inclination of the screen, the reflector 15*c* is disposed at an appropriate angle to axis 12*c*, and both the reflector and film 20*c* are also disposed at proper angles to optical axis 21*c* of the first lens system 14*c***.

Each of the afocal lens systems **14*c* and 16*c* consists of two separate lenses or lens structures 33 and 34, each of which is of positive focal length and has a primary focal plane at its entrance side and a secondary focal plane at its exit side. The two lenses 33 and 34 are so positioned that the secondary focal plane of the first lens structure coincides approximately, and preferably exactly, with the primary focal plane of the second lens structure, as at the plane designated 35** in FIG. 9.

Reflector **15*c* may be a concave fully specular mirror, preferably of spherical shape, and constructed to reflect the light forming different portions of the image produced on mirror 15*c* by lens system 14*c* downwardly toward the entrance pupil of afocal lens system 16*c*, with the light from the different portions of the image being converged by the mirror to pass substantially entirely through that lens system. The initial lens system 14*c* is designed to produce a curved image, which will fall on and follow the curvature of spherical reflector 15*c***.

The final image produced on screen **11*c* of FIG. 9 is free of keystone distortion by virtue of the capacity of lens systems 14*c* and 16*c* to avoid introduction of any such distortion, is magnified greatly because of the use of two successive lens systems 14*c* and 16*c*, and is of adequate brightness by virtue of the provision of director mirror 15*c*, which converges the light from the initial image to pass through second lens assembly 16*c***.

In order to prevent the imaging on screen **11*c* of any specks of dust or the like which may be present on the surface of mirror 15*c*, I may position mirror 15*c* so that it does not coincide exactly with the focal plane of the projected image, though mirror 15*c* is still located at approximately that focal plane. If the mirror is thus positioned slightly off of the focal plane, second lens system 16*c* can still view the image in the mirror, and the mirror can still direct substantially all of the light through lens system 16*c*, but the second mirror will not image accurately on screen 11*c* any particles on the surface of the mirror. If the mirror coincides with the focal plane of the image projected by lens system 14*c*, the mirror may be made slightly diffusing, to reduce the criticality with which the mirror must be formed in order to direct substantially all of the light to lens system 16*c***.

Figure 11:
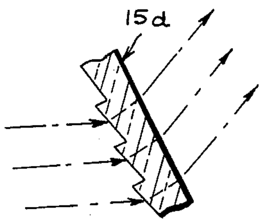
FIG. 11 illustrates a Fresnel lens which may be employed in lieu of the director lens of FIG. 9.

FIG. 10 shows diagrammatically another form of the invention which is the same as that of FIG. 9 except that a lens **15*d* has been substituted for reflector 15*c*, with the image from first projection lens system 14*d* being focused on lens 15*d*, at an inclination, and with the lens 15*d* acting as a director for converging the light into second projection lens system 16*d*, to attain the advantages discussed above. FIG. 11 represents fragmentarily a portion of director lens 15*d***, which may be a Fresnel type lens having its various segmental portions designed to attain the desired directional effect.

One feature which is present in all forms of the invention thus far described, and which is considered desirable under certain operating conditions and circumstances, resides in the fact that in all of these arrangements the two discussed first and second projection systems are either both focal in character, or both afocal. Stated differently, both systems (e.g. systems 14 and 16 in the first form or the corresponding systems in other forms) have equally finite focal characteristics or focality.

In another form of the invention, which is advantageous under various other circumstances, and whose structure will be obvious from the above discussed drawings without further illustration, the first system may be focal while the second system is afocal. The focal first system may then be an on-axis system, whose film or other viewed object is perpendicular to the axis of the first system rather than inclined, and whose projected image when in focus is similarly perpendicular and not inclined to that axis. The director lens, reflector or screen (serving the function of reflector 15 of FIG. 1 or the corresponding parts of the other forms) is correspondingly perpendicular to the axis of the first system, but is inclined to the axis of the afocal second system (as in FIG. 10) to produce an inclined, undistorted and focused image on the final screen, which is also inclined to the axis of the second system. In such an arrangement, the first system, because it is focal, can attain high magnification (without keystone distortion since the first system is of a non-inclined type), while the second system, because it is afocal, can effectively introduce the desired inclination in the ultimate focused image (though such an afocal system is not capable of attaining as much magnification as the focal system).

While I have typically illustrated certain embodiments of my invention, it is to be understood that the invention is not limited to these specific arrangements, but rather is applicable broadly to any apparatus falling within the scope of the appended claims. For instance, it is contemplated that reflective or partially reflective projection systems, such as systems of the Catadioptric type, may if desired be substituted for the lens type projections systems 14 and 16 of FIG. 1, and the equivalent projection systems of the other arrangements, though projection lenses are of course preferred. Also, multiple stage systems may be provided in which more than two projection systems, and more than one director system, are utilized, with the light being passed successively through as many of such systems as may be desired for a particular installation.

Where the director elements are designed to have some diffusing capacity, these elements may approach the character of a projection screen, either of the reflective or transmissive type, but still functioning to direct light predominantly to the second projection system.

I claim:

1. A projector for projecting light along a predetermined main optical axis onto a screen which is essentially inclined with respect to said axis, comprising a first optical projection system for projecting a first image, a second optical projection system positioned and constructed to view said first image and to reproject it along said main axis onto said inclined screen as a second image which is larger than said first image and is in focus on the inclined screen and essentially free of keystone distortion, said first image when in focus being essentially inclined with respect to said second system and said main axis, and an optical director system interposed optically between said first and second systems and positioned at approximately the plane of focus of said first image and constructed to direct the light from different portions of said first image primarily along converging paths in a relation concentrating the light more on said second optical system than if said director system were not present.

2. A projector for projecting light along a predetermined main optical axis onto a screen which is essentially inclined with respect to said axis, comprising a first optical projection system for projecting a first image, a second optical projection system positioned and constructed to view said first image and to reproject it along said main axis onto said inclined screen as a second image which is larger than said first image and is in focus on the inclined screen and essentially free of keystone distortion, said first image when in focus being essentialy inclined with respect to said second system and said main axis, and a reflector structure interposed optically between said first and second systems and positioned at approximately the plane of focus of said first image and constructed to direct the light from different portions of said first image primarily along converging paths in a relation concentrating the light more on said second optical system than if said reflector structure were not present.

3. A projector for projecting light along a predetermined main optical axis onto a screen which is essentially inclined with respect to said axis, comprising a first optical projection system for projecting a first image, a second optical projection system positioned and constructed to view said first image and to reproject it along said main axis onto said inclined screen in focus and essentially free of keystone distortion, said first image when in focus being essentially inclined with respect to said second system and said main axis, and a reflector structure interposed optically between said first and second systems and positioned at approximately the plane of focus of said first image and including a large number of reflective facets positioned and constructed to direct the light from different portions of said first image respectively along paths converging toward said second optical system in a relation concentrating the light more on said second optical system than if said reflector structure were not present.

4. A projector for projecting light along a predetermined main optical axis onto a screen which is essentially inclined with respect to said axis, comprising a first optical projection system for projecting a first image, a second optical projection system positioned and constructed to view said first image and to reproject it along said main axis onto said inclined screen as a second image which is larger than said first image and is in focus on the inclined screen and essentially free of keystone distortion, said first image when in focus being essentially inclined with respect to said second system and said main axis, and a director lens system interposed optically between said first and second system and positioned at approximately the plane of focus of said first image and constructed to direct the light from different portions of said first image primarily along converging paths in a relation concentrating the light more on said second optical system than if said director lens system were not present.

5. A projector for projecting light along a predetermined main optical axis onto a screen which is essentially inclined with respect to said axis, comprising a first afocal projection lens system for projecting a first image, a second afocal projection lens system positioned and constructed to view said first image and to reproject it along said main axis onto said inclined screen as a second image which is larger than said first image and is in focus on the inclined screen and essentially free of keystone distortion, said first image when in focus being essentially inclined with respect to said second system and said main axis, and an optical director system interposed optically between said first and second systems and positioned at approximately the plane of focus of said first image and constructed to direct the light from different portions of said first image primarily along converging paths in a relation concentrating the light more on said second system than if said director system were not present, each of said afocal systems including two lens structures having primary and secondary focal planes with the secondary focal plane of one lens structure coinciding approximately with the primary focal plane of the other lens structure.

6. A projector for projecting light along a predetermined main optical axis onto a screen which is essentially inclined with respect to said axis, comprising a first afocal projection lens system for projecting a first image, a second afocal projection lens system positioned and constructed to view said first image and to reproject it along said main axis onto said inclined screen as a second image which is larger than said first image and is in focus on the inclined screen and essentially free of keystone distortion, said first image when in focus being essentially inclined with respect to said second system and said main axis, and a concave reflector interposed optically between said first and second systems and positioned at approximately the plane of focus of said first image and constructed to direct the light from different portions of said first image primarily along converging paths in a relation concentrating the light more on said second system than if said director system were not present, each of said afocal systems including two lens structures having primary and secondary focal planes with the secondary focal plane of one lens structure coinciding approximately with the primary focal plane of the other lens structure.

7. A projector for projecting light along a predetermined main optical axis onto a screen which is essentially inclined with respect to said axis, comprising a first afocal projection lens system for projecting a first image, a second afocal projection lens system positioned and constructed to view said first image and to reproject it along said main axis onto said inclined screen as a second image which is larger than said first image and is in focus on the inclined screen and essentially free of keystone distortion, said first image when in focus being essentially inclined with respect to said second system and said main axis, and a Fresnel lens system interposed optically between said first and second systems and positioned at approximately the plane of focus of said first image and constructed to direct the light from different portions of said first image primarily along converging paths in a relation concentrating the light more on said second system than if said Fresnel lens system were not present, each of said afocal systems including two lens structures having primary and secondary focal planes with the secondary focal plane of one lens structure coinciding approximately with the primary focal plane of the other lens structure.

8. A projector for projecting light along a predetermined main optical axis onto a screen which is essentially inclined with respect to said axis, comprising a first optical projection system for projecting a first image, a second optical projection system positioned and constructed to view said first image and to reproject it along said main axis onto said inclined screen as a second image which is larger than said first image and is in focus on the inclined screen and essentially free of keystone distortion, said first image when in focus being essentially inclined with respect to said second system and said main axis, and a reflector structure interposed optically between said first and second systems and positioned at approximately the plane of focus of said first image and constructed to direct the light from different portions of said first image primarily along converging paths in a relation concentrating the light more on said second optical system than if said reflector structure were not present, said reflector structure including a large number of reflective facets which are elongated and curved concavely in one direction and present an essentially sawtooth cross section in a second direction perpendicular to said first direction.

9. A projector for projecting light along a predetermined main optical axis onto a screen which is essentially inclined with respect to said axis, comprising a first optical projection system for projecting a first image, means for holding at an inclination to said first system a film carrying markings to be projected as said first image with the latter also being inclined with respect to said first system, a second optical projection system positioned and constructed to view said first image and to reproject it along said main axis onto said inclined screen as a second image which is larger than said first image and is in focus on the inclined screen and essentially free of keystone distortion, said first image when in focus being essentially inclined with respect to said second system and said main axis, and an optical director system interposed optically between said first and second systems and positioned at approximately the plane of focus of said first image and constructed to direct the light from different portions of said first image primarily along converging paths in a relation concentrating the light more on said second optical system than if said director system were not present.

10. A projector for projecting light along a predetermined main optical axis, comprising a focal first optical projection system for projecting a first image, an afocal second optical projection system positioned and constructed to view said first image and to reproject it along said main axis onto said inclined screen in focus and essentially free of keystone distortion, said first image when in focus being essentially inclined with respect to said second system and said main axis but not with respect to said first system, and an optical director system interposed optically between said first and second systems and positioned at approximately the plane of focus of said first image and constructed to direct the light from different portions of said first image primarily along converging paths in a relation concentrating the light more on said second optical system than if said director system were not present.

11. A projector comprising a first optical projection system for projecting a first image, a second optical projection system positioned and constructed to view said first image and reproject it as a second image which is larger than said first image, said first image when in focus being essentially inclined with respect to said second system, a screen which is inclined with respect to said second system and onto which said second image is projected in inclined but focused form and essentially free of keystone distortion, and an optical director system interposed optically between said first and second systems and positioned at approximately the plane of focus of said first image and constructed to direct the light from different portions of said first image primarily along converging paths in a relation concentrating the light more on said second optical system than if said director system were not present.

12. A projector comprising a first optical projection lens system for projecting a first image, means for holding at an inclination to said first system film carrying markings to be projected as said first image with the latter also being inclined with respect to said first system, a second optical projection lens system positioned to view said first image and reproject it as a second image, said first image when in focus being essentially inclined with respect to said second system, a screen onto which said second image is projected and inclined with respect to said second system, and a reflector structure interposed optically between said first and second systems and positioned at approximately the plane of focus of said first mentioned image and having a large number of different reflective areas facing in different directions in a relation directing the light from different portions of said first image primarily along converging paths in a relation concentrating the light more on said second optical system than if said reflector structure were not present.

13. A projector comprising a first optical projection system for projecting an image, a structure onto which said image is projected and which is essentially inclined with respect to said first system to introduce an initial keystone distortion into the image, and a second optical projection system positioned to receive light from said structure and project a corrected image, said structure being inclined with respect to said second system so that said corrected image when focused is also inclined and in a direction introducing a reverse keystone distortion into said corrected image the opposite of said initial distortion and at least partially compensating therefor.

14. A projector comprising a first optical projection system for projecting an image, means for holding at an inclination to said first system a sheet carrying markings to be projected as said image in inclined form, a structure onto which said image is projected and which is essentially inclined with respect to said first system to introduce an initial keystone distortion into the image, a second optical projection system positioned to receive light from said structure and project a corrected image, said structure being inclined with respect to said second system so that said corrected image when focused is also inclined and in a direction introducing a reverse keystone distortion into said corrected image the opposite of said initial distortion and at least partially compensating therefor.

15. A projector comprising a first optical projection system for projecting an image, a structure onto which said image is projected and which is essentially inclined with respect to said first system to introduce an initial keystone distortion into the image, a second optical projection system positioned to receive light from said structure and project a corrected image, said structure being inclined with respect to said second system so that said corrected image when focused is also inclined and in a direction introducing a reverse keystone distortion into said corrected image the opposite of said initial distortion and at least partially compensating therefor, and a screen onto which said corrected image is focused and inclined with respect to said second system.

16. A projector comprising a first optical projection system for projecting an image, a reflector structure onto which said image is projected and which is essentially inclined with respect to said first system to introduce an initial keystone distortion into the image, and a second optical projection system positioned to receive light from said reflector structure and project a corrected image, said reflector structure being inclined with respect to said second system so that said corrected image when focused is also inclined and in a direction introducing a reverse keystone distortion into said corrected image the opposite of said initial distortion and at least partially compensating therefor.

17. A projector comprising a first optical projection system for projecting an image, an optical director structure onto which said image is projected and which is essentially inclined with respect to said first system to introduce an initial keystone distortion into the image, and a second optical projection system positioned to receive light from said director structure and project a corrected image, said director structure being inclined with respect to said second system so that said corrected image when focused is also inclined and in a direction introducing a reverse keystone distortion into said corrected image the opposite of said initial distortion and at least partially compensating therefor, said director structure being positioned at approximately the plane of focus of said first mentioned image produced by said first system and being constructed to direct the light from different portions of said first image primarily along converging paths in a relation concentrating the light more on said second system than if said director structure were not present.

18. A projector comprising a first optical projection system for projecting an image, a reflector structure onto which said image is projected and which is essentially inclined with respect to said first system to introduce an initial keystone distortion into the image, and a second optical projection system positioned to receive light from said reflector structure and project a corrected image, said reflector structure being inclined with respect to said second system so that said corrected image when focused is also inclined and in a direction introducing a reverse keystone distortion into said corrected image the opposite of said initial distortion and at least partially compensating therefor, said reflector structure being positioned at approximately the plane of focus of said first mentioned image produced by said first system and including a large number of reflective facets disposed at different angles in a relation directing the light from different portions of said first image primarily along paths converging toward said second system in a relation concentrating the light more on said second system than if said reflector structure were not present.

19. A projector comprising a first optical projection system for projecting an image, a structure onto which said image is projected and which is essentially inclined with respect to said first system to introduce an initial keystone distortion into the image, a second optical projection system positioned to receive light from said structure and project a corrected image, said structure being inclined with respect to said second system so that said corrected image when focused is also inclined and in a direction introducing a reverse keystone distortion into said corrected image the opposite of said initial distortion and at least partially compensating therefor, and a screen onto which said corrected image is focused and inclined with respect to said second system said reflector structure being positioned at approximately the plane of focus of said first mentioned image produced by said first system and including a large number of reflective facets disposed at different angles in a relation directing the light from different portions of said first image primarily along paths converging toward said second system in a relation concentrating the light more on said second system than if said reflector structure were not present.

20. A projector as recited in claim 19, in which said facets are elongated and curved in a first direction and form essentially a sawtooth cross section in a perpendicular direction.

21. A projector for projecting light along a predetermined main optical axis onto a screen which is essentially inclined with respect to said axis, comprising a first optical projection system for projecting a first image, a second optical projection system positioned and constructed to view said first image and to reproject it along said main axis onto said inclined screen as a second image which is larger than said first image and is in focus on the inclined screen and essentially free of keystone distortion, said first image when in focus being essentially inclined with respect to said second system and said main axis, and an optical director system interposed optically between said first and second systems and positioned at approximately the plane of focus of said first mentioned image and constructed to direct the light from different portions of said first image primarily along converging paths in a relation cencentrating the light more on said second optical system than if said director system were not present, said two projection systems both being within the same one of the two categories of focal and afocal systems.

22. A projector as recited in claim 12, in which said reflector structure has at said different areas a larger number of reflective facets for directing light along said converging paths.

23. A projector comprising a first optical projection lens system for projecting a first image, means for holding at an inclination to said first system film carrying markings to be projected as said first image with the latter also being inclined with respect to said first system, a second optical projection lens system positioned and constructed to view said first image and reproject it as a second image, said first image when in focus being essentially inclined with respect to said second system, a screen onto which said second image is projected and inclined with respect to said second system, and a director lens system interposed optically between said first and second systems and positioned at approximately the plane of focus of said first mentioned image and constructed to direct the light from different portions of said first image primarily along converging paths in a relation concentrating the light more on said second optical system than if said director lens system were not present.

24. A projector comprising a first afocal optical projection lens system for projecting a first image, means for holding at an inclination to said first system film carrying markings to be projected as said first image with the latter also being inclined with respect to said first system, a second afocal optical projection lens system positioned and constructed to view said first image and reproject it as a second image, said first image when in focus being essentially inclined with respect to said second system, a screen onto which said second image is projected and inclined with respect to said second system, and an optical director system interposed optically between said first and second systems and positioned at approximately the plane of focus of said first mentioned image and constructed to direct the light from different portions of said first image primarily along converging paths in a relation concentrating the light more on said second optical system than if said optical director system were not present, each of said afocal systems including two lens structures having primary and secondary focal planes with the secondary focal plane of one lens structure coinciding approximately with the primary focal plane of the other lens structure.

25. A projector as recited in claim 24, in which said optical director system is a concave reflector.

26. A projector as recited in claim 24, in which said optical director system is a Fresnel lens system.

27. A projector comprising a focal first optical projection lens system for projecting a first image, means for holding at an inclination to said first system film carrying markings to be projected as said first image with the latter also being inclined with respect to said first system, an afocal second optical projection lens system positioned and constructed to view said first image and reproject it as a second image, said first image when in focus being essentially inclined with respect to said second system but not with respect to said first system, a screen onto which said second image is projected and inclined with respect to said second system, and an optical director system interposed optically between said first and second systems and positioned at approximately the plane of focus of said first mentioned image constructed to direct the light from different portions of said first image primarily along converging paths in a relation concentrating the light more on said second optical system than if said director system were not present.

28. A projector as recited in claim 12, in which said reflector structure has at said different areas a large number of reflective facets which are elongated and curved in a first direction and form essentially a sawtooth cross section in a perpendicular direction.

29. A projector comprising a first optical projection system for projecting a first image, means for holding at an inclination to said first system film carrying markings to be projected as said first image with the latter also being inclined with respect to said first system, a second optical projection system positioned and constructed to view said first image and reproject it as a second image, said first image when in focus being essentially inclined with respect to said second system, a screen onto which said second image is projected and inclined with respect to said second system, and an optical director system interposed optically between said first and second systems and positioned at approximately the plane of focus of said first mentioned image and constructed to direct the light from different portions of said first image primarily along converging paths in a relation concentrating the light more on said second optical system than if said director system were not present, said two projection systems both being within the same one of the two categories of focal and afocal systems.

30. A projector for projecting light onto a screen, comprising a first optical projection system for projecting a first image, a second optical projection system positioned and constructed to view said first image and to reproject it onto said screen as a second image which is larger than said first image and adapted to be viewed by an audience, and an optical director system interposed optically between said first and second systems and positioned at approximately the plane of focus of said first image and constructed to direct the light from different portions of said first image primarily along converging paths in a relation concentrating the light more on said second optical system than if said director system were not present.

References Cited by the Examiner

UNITED STATES PATENTS

| | | | |
|---|---|---|---|
| 751,347 | 2/1904 | Scheimpflug | 88—24 |
| 1,259,711 | 3/1918 | Allison | 88—24 |
| 1,291,274 | 1/1919 | Uebelmesser | 88—24 |
| 1,651,574 | 12/1927 | Beechyln | 352—85 |
| 2,187,803 | 1/1940 | Griffin | 88—24 |
| 2,216,512 | 10/1940 | Fetter | 88—24 |
| 2,553,903 | 5/1951 | Dufour | 352—89 |

FOREIGN PATENTS

| | | |
|---|---|---|
| 86,807 | 7/1921 | Austria. |
| 601,573 | 5/1948 | Great Britain. |

NORTON ANSHER, *Primary Examiner.*

HAROLD H. FLANDERS, *Assistant Examiner.*